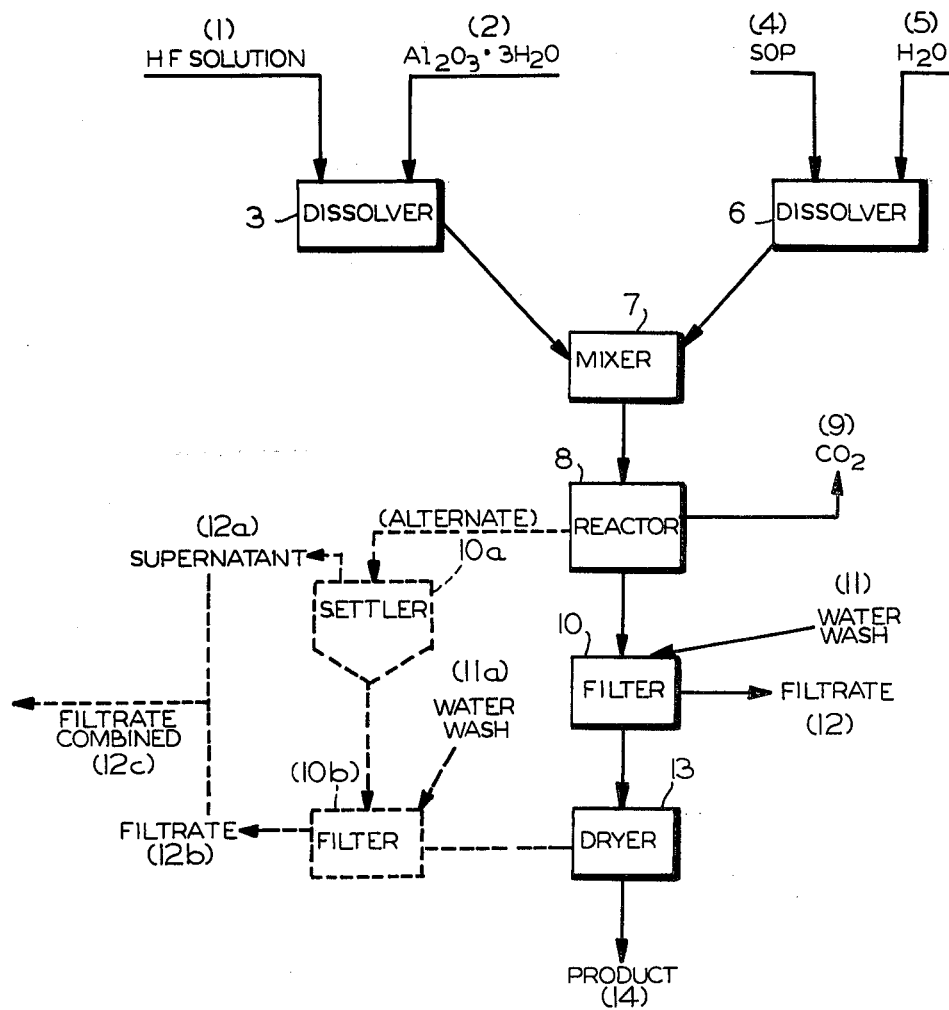

3,207,575
PROCESS FOR TREATMENT OF SALTING OUT PRODUCT TO RECOVER SODIUM ALUMINUM FLUORIDE AND SULFURIC ACID
Meriwether L. Garing and Fredrick Earl Adkins, Jr., Benton, and George E. Branigan, Little Rock, Ark., assignors to Reynolds Metals Company, Richmond, Va., a corporation of Delaware
Filed Mar. 27, 1962, Ser. No. 182,808
9 Claims. (Cl. 23—88)

This invention relates to a novel method for the concurrent production of sodium aluminum fluoride and sulfuric acid from a waste by-product of the processing of bauxite or other aluminous ores in the preparation of alumina by the Bayer or Bayer-sinter process. More particularly, the invention concerns the conversion of sodium, fluorine and sulfur values of this by-product to sodium aluminium fluoride and sulfuric acid by novel and econmical methods.

In the processing of aluminous ores, and especially Arkansas bauxite, in order to extract the aluminum content thereof in the form of alumina or alumina hydrate, it is conventional practice to subject the ore, in accordance with the Bayer-sinter process, to digestion with a hot solution of sodium hydroxide. Thereby the aluminum content of the ore goes into solution in the sodium hydroxide, forming sodium aluminate solution. The ore constituents not soluble in the sodium hydroxide solution, known as red mud, and including iron oxide, silica, and other impurities, form a slurry with the sodium aluminate solution. Some of the alumina and soda insolubilized by the silica in the ore also pass into the red mud. The major portion of the red mud is separated from the sodium aluminate solution by subjecting the slurry leaving the digesters to a thickening or sedimentation operation, accompanied by decantation of the partially clarified sodium aluminate solution. The decanted sodium aluminate solution is filtered hot (about 190° F.) and subsequently subjected to hydrolysis, and the alumina recovered therefrom in the form of alumina hydrate by autoprecipitation, in accordance with conventional procedures. The red mud is not discarded, but after adjustment of its composition by the addition of limestone and soda ash, is put through a sintering operation. The sinter is then leached with caustic soda solution which dissolves most of the alumina and soda. The sodium aluminate solution thus recovered is subjected to hydrolysis as in the Bayer circuit and the alumina recovered in the conventional manner. The caustic liquor from Bayer-sinter circuits is recycled for the digestion of fresh bauxite, usually after previous reconcentration in salting-out type evaporators.

Fluoride and sulfate ions, present as contaminants in the bauxite or other ores, tend to accumulate in the form of sodium compounds in the recycled caustic liquor, and some usually precipitate during concentration in the evaporators. The precipitate, hereinafter called salting-out product or SOP, is filtered and recovered. In the case of Arkansas bauxite ore, the amount of SOP recovered is in the range of about 14 pounds per ton of ore processed. At the present time, this by-product SOP has no commercial value and is largely discarded, although it contains substantial sodium, fluorine and sulfur values. It has been proposed to recover the soda and fluorine values of SOP in the form of cryolite by treatment with ammonium fluoride, but this method has certain disadvantages and does not appear commercially feasible.

In accordance with the present invention, a novel method is provided whereby the fluorine and soda values of SOP are recovered in the form of sodium aluminum fluoride, while the sulfate values are recovered simultaneouly in the form of sulfuric acid.

The sodium aluminum fluoride made in accordance with this invention can be $Na_3AlF_6$ (cryolite) or $Na_5Al_3F_{14}$ (chiolite) or a mixture of cryolite and chiolite depending on the proportions of the reactants. In any of the above forms, the sodium aluminum fluoride prepared in accordance with this invention is a valuable raw material for the manufacture of aluminum metal and for a variety of other uses such as fluxes and fluoride chemicals. Sulfuric acid, which is concurrently prepared in accordance with this invention, can be used directly for cleaning scale in heat exchangers and for several well known applications.

The salting-out product as obtained from the recycle caustic liquor evaporators in the Bayer-sinter process using Arkansas bauxite is a mixture of several sodium compounds and has the following typical analysis:

*Typical analysis of SOP*

|                  | Percent by weight |
|------------------|-------------------|
| $Na_2O$          | 45.14             |
| $SO_4$           | 44.53             |
| $CO_2$           | 6.44              |
| F                | 2.74              |
| $Al_2O_3$        | 1.03              |
| Loss on ignition | 5.40              |

Depending on the type of Arkansas bauxite used and the operating conditions in the Bayer-sinter process, the SOP may have the following range of chemical constituents:

|                  | Percent by weight |
|------------------|-------------------|
| $Na_2O$          | 44–50             |
| $SO_4$           | 44–50             |
| $CO_2$           | 1–7               |
| F                | 1–10              |
| $Al_2O_3$        | .5–2              |
| Loss on ignition | 1–10              |

The SOP has a substantial proportion of fluorine, possibly present as the mineral schairite, $NaF \cdot Na_2SO_4$, one of the more crystalline compounds identified in SOP by X-ray analysis.

In accordance with this invention, the SOP is treated with a solution of alumina hydrate in concentrated hydrofluoric acid, the materials reacting to form sodium aluminum fluoride and sulfuric acid, as represented by the following equations:

*Reactions forming cryolite and $H_2SO_4$*

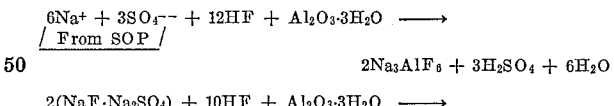

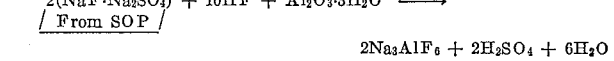

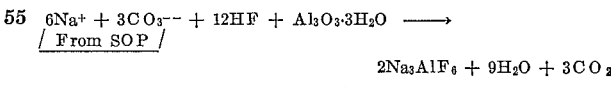

*Reactions forming chiolite and $H_2O_4$*

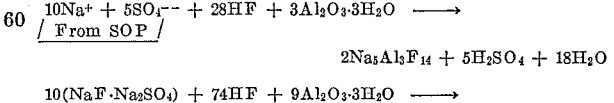

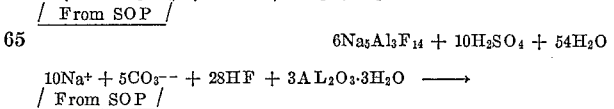

The above equations are only broadly representative of the actual reactions and are not to be considered as restricting, but they illustrate one aspect of this invention, namely that the SOP supplies all the $Na^+$ ion, $SO_4^{--}$ ion, and part of the $F^-$ ions in the final products, sodium aluminum fluoride and $H_2SO_4$. The SOP can be used either as a solid or as an aqueous solution or as a solid-liquid slurry in carrying out the invention. In the preferred process of this invention, the SOP is used as an aqueous solution, since it is easier to handle and more economical than the dried solid SOP. The SOP as recovered from the evaporators shows a saturation solubility of about 15 gms. per 100 gms. of water at ambient temperature.

Processes have been described in the prior art whereby alumina hydrate is converted into solid aluminum fluoride gel by treatment with hydrofluoric acid having a concentration between 30% and 40%, and whereby waste fluorine-containing gases are scrubbed to obtain a weak lye containing sodium fluoride, from which cryolite is obtained by treatment with a suspension of alumina hydrate in 80% hydrofluoric acid. However, these processes are clearly distinguishable from the novel recovery methods of the present invention, employing a hitherto waste product, SOP, and yielding not only sodium aluminum fluoride but utilizable sulfuric acid.

In order that the steps set forth in the preferred practice of this invention may be readily followed and understood, there is included as part of this application a drawing which presents a flowsheet showing in diagrammatic form the steps of the preferred process. It is to be understood that the preferred example and flowsheet are to be interpreted as illustrative of one way in which this invention is carried out, but the invention is not limited thereto.

In carrying out the preferred practice of this invention, aqueous hydrofluoric acid (designated as 1 in flowsheet) is used to dissolve alumina hydrate 2 in a dissolver 3. The aqueous hydrofluoric acid has a concentration in the range of 35 to 50% by weight of HF depending on the desired final concentration of $H_2SO_4$ product of the invention. The quantity of aqueous HF used is such that it will provide, together with the SOP solution, all the fluorine ions necessary for the production of sodium aluminum fluoride.

The aqueous hydrofluoric acid used in this invention is generally produced by condensing the HF gas generated by the conventional process of reacting fluorspar with sulfuric acid. Aqueous HF solution from any other process is also equally usable, provided the soultion is of such quality that it does not contain undesirable impurities such as silica and heavy metals which would contaminate the final sodium aluminum fluoride product.

The alumina used in the process of the invention is preferably in the hydrate form as gibbsite or bayerite. The gibbsite used in the preferred process has a particle size distribution of 15 to 50% by weight +200 mesh and 85 to 50% −200 mesh. The particle size distribution is not critical, but the alumina should be fine enough to react at a reasonably rapid rate with the aqueous hydrofluoric acid. Alumina hydrate in the gibbsite phase is used in the preferred practice of this invention for economic reasons, as it is the cheapest pure form of alumina hydrate. Other alumina hydrates or partially hydrated aluminas or aluminum sulfate, or aluminum metal, can be used for the process of this invention, but these aluminum compounds are more expensive per unit of Al ion compared to gibbsite produced from the conventional Bayer process.

The dissolver 3 is lined with HF resistant material such as Teflon (tetrafluoroethylene) or polyethylene, and has means to agitate the reactants and to remove the heat generated in the reaction so as to keep the solution at a temperature less than about 110° C. In about five minutes after addition of alumina hydrate to the aqueous HF solution, the reaction is complete, giving a clear solution without any solid residue.

The F to $Al_2O_3$ weight ratio in the reactants is maintained between about 2.0 and about 2.2, depending upon the F and $Al_2O_3$ content of the SOP solution to be reacted therewith subsequently in the process. Thus, for example, using a 48% aqueous HF solution and alumina trihydrate, a typical analysis of the solution discharged from dissolver 3 is 35% F and 16% $Al_2O_3$, and the solution has a specific gravity of about 1.28 g./ml.

The salting-out product 4 as used in the practice of this invention is obtained, for example, after contrifuging out the mother liquor from the solids which are separated from the recycled caustic liquor in the Bayer-sinter process, using for example, Arkansas bauxite. The SOP is dissolved in a dissolver 6 provided with a suitable agitator, by addition of enough water 5 at a temperature of about 80–100° F. to make approximately a 15% by weight solution of SOP depending upon the SOP analysis. The SOP solution typically has a specific gravity of 1.138 g./ml. (at 26° C.) and has, for example, an analysis of 6.53% by weight $Na_2O$, 6.36% $SO_4$, 0.47% F, 0.20% $Al_2O_3$ and 1.17% $CO_2$.

The quantity of SOP used is such that it, together with the $HF-Al_2O_3 \cdot 3H_2O$ reaction product from dissolver 3, will provide the 97–100% F and 100–103% $Na_2O$ and $Al_2O_3$ required to produce a sodium aluminum fluoride having a NaF to $AlF_3$ molar ratio of 3:1.

The next step in accordance with the invention is the mixing together of the solution from dissolver 3 and that from dissolver 6. An important aspect of the practice of this invention lies in this mixing. It is found that a most surprising and unexpected improvement in filtration rate and particles size is obtained by mixing the two aforementioned solutions in such a way that at the point of mixing there will be present the stoichiometric proportions of $Na^+$, $Al^{+++}$ and $F^-$ ions for the formation of $Na_3AlF_6$. This is accomplished by regulating the flow rates of the two solutions and feeding them through a mixing device, for example, the two branches of a T or a Y pipe connection designated as the mixer 7 in the flowsheet, whereby the several reactions explained earlier will rapidly take place, forming sodium aluminum fluoride and sulfuric acid.

From the mixer 7, the slurry flows to a reactor 8 equipped with an agitator to lift and circulate the solids gently. Even though most of the products of the reaction are formed in the mixer 7, a retention period of 10 to 20 minutes in the reactor 8 is advantageously employed, which assures completion of the reaction and perhaps allows for more agglomeration of the solids. The temperature in the reactor 8 is maintained in the range of 100–150° F. The gaseous product of the reaction, $CO_2$ 9, is vented from the reactor and may be recovered for use.

The slurry from reactor 8 has a concentration of $H_2SO_4$ between about 5% and 6% by weight, which has been found to be optimum, greater concentrations of $H_2SO_4$ tending to diminish the cryolite yield and give rise to difficulties in filtration and washing of the product.

However, depending upon the water introduced with the original starting materials, the sulfuric acid concentration in the liquid phase can go as high as 10% without affecting the fluorine recovery. It should be noted that the reaction differs from known prior art reactions in that it takes place in an acid medium and not under alkaline or neutral conditions.

From the reactor 8, the slurry, which now contains sodium aluminum fluoride in the solid phase and $H_2SO_4$ solution in the liquid phase, can take either of two paths, the optional one shown in dotted lines and the preferred one shown in solid lines.

In the preferred path, the slurry from the reactor 8 goes to a vacuum filter 10 to separate the solid, sodium aluminum fluoride, from the liquid phase. The filtration rate obtained is about 180 gallons/hour per square foot of filtering area, when forming a cake 0.4″ thick in 60 seconds at a vacuum of 20″ Hg.

In accordance with the present invention it was found that by control of the stoichiometric relationships at the point of contact between the alumina-hydrofluoric acid solution and the SOP solution, there may be obtained a sodium aluminum fluoride product having optimum particle size distribution and maximum filtration rates. Thus, by bringing these two solutions together at or near stoichiometric proportions, holding the fluorine concentration to 97–100% of stoichiometric, and $Na_2O$ and $Al_2O_3$ at 100–103%, with a fairly rapid reaction rate promoted by mixing, a sodium aluminum fluoride product may be obtained having a filtration rate of about 180 gal./hr./sq. ft. Using a somewhat less rapid reaction rate, the filtration rate may be of the order of 150–160 gal./hr./sq. ft. Additionally, filtration temperature may affect filtration rate by influencing viscosity. The slurry of sodium aluminum fluoride may be settled at 120°–150° F. with approximately 2–4 ft./hr. settling rates to yield clear supernatants with about 31–33% solids in the compact.

The sodium aluminum fluoride made by the process of the invention is unusually coarse and has the characteristic particle size distribution shown in Table 1. For comparison purposes, the particle size distribution and filtration rate of sodium aluminum fluoride formed by the simple addition of a solution of SOP from dissolver 6 to the $HF-Al_2O_3 \cdot H_2O$ solution from dissolver 3 is also shown. In the latter step, it is apparent that stoichiometrical proportions have not been maintained at the point of contact of the two solutions, as required by the preferred practice of this invention.

withdrawn from the top. The settling rate obtained in this operation is in the order of 2–4 ft./hour at a temperature of 120–150° F. It may be noted in this connection that settling cannot be achieved effectively by producing a slurry formed by the simple addition of SOP solution to a solution of $HF-Al_2O_3 \cdot 3H_2O$ without maintaining the stoichiometric proportions of the reacting ions at the point of contact of the solutions.

The settled solids from the settler 10A are withdrawn and fed to a filter 10B for further separation of the solids from the mother liquor. The filtration rate obtained is in the order of 100–150 gallons/hour/sq. ft. of filtering area. The filter cake is washed with water 11A as before and the filtrate 12B, which contains the mother liquor and wash water, is combined with the supernatant liquor 12A from the settler 10A to produce the sulfuric acid product 12C of the composition given before. The fiter cake then goes to the dryer 13 and the process is finished as described under the preferred process path.

The process of the invention is further illustrated by the following examples:

*Example I*

Conditions:
 SOP—Aqueous Solution—Low in fluorine content.
 HF—48.5%.
 Mixing—Maintaining stoichiometric proportion of reacting ions at point of contact.

Hydrofluoric acid solution containing 48.5% by weight of HF was taken in a polyethylene vessel and alumina

*Table 1*

| Process of mixing | Particle size distributions, percent by weight of fraction | | | | | Filtration rate | |
| --- | --- | --- | --- | --- | --- | --- | --- |
|  | +20 micron | 20×10 micron | 10×5 micron | 5×3 micron | −3 micron | Gals./hr., sq. ft. | Filtrate |
| SOP solution added to a solution of $HF-Al_2O_3 \cdot 3H_2O$. | 2.0 | 0.5 | 0.7 | 1.4 | 95.4 | ~20 | Cloudy, contains the fine particles of sodium aluminum fluoride. |
| SOP solution and $HF-Al_2O_3 \cdot 3H_2O$ mixed continuously in stoichiometric proportion as by the preferred practice of the invention. | 11.1 | 24.9 | 38.8 | 6.6 | 18.5 | 180 | Clear, no solids. |

The above results clearly indicate the remarkable improvement in the filtration rate obtained by the preferred process of the invention.

The filter cake is washer with water 11 at 150–180° F. at the rate of 108 g. $H_2O$/100 g. cake. The filtrate 12 which contains the mother liquor and wash water, has typically an analysis of 6% $H_2SO_4$, 0.5–0.6% F, trace of $Al_2O_3$, and 0.3–1.2% $Na_2O$. The filtrate can be directly used for several cleaning operations in the Bayer plant, or it can be concentrated to make strong sulfuric acid and recycled to treat fluorspar for the production of hydrofluoric acid.

The filter cake of sodium aluminum fluoride is then fed to a conventional dryer 13 and dried at 220° F. to make the product 14 having an analysis in the range of 52–54% F, 39–43% $Na_2O$, 24–28% $Al_2O_3$, 0.1–0.9% $SO_4$ and about 1% loss on ignition.

The high fluorine content of the product of this invention, which is substantially higher than that of conventional synthetic cryolite, makes it extremely valuable as a raw material for the reduction cells in the production of aluminum metal. The above described preferred process of this invention recovers from the starting materials 94–97% of the F, 90–93% of the $Na_2O$ and 99–100% of the $Al_2O_3$ values in the sodium aluminum fluoride; and 99–100% of the $SO_4$ value in the sulfuric acid.

Referring to the flowsheet again, the optional path involves feeding the slurry from reactor 8 to a settler 10A where the solids settle to about 30% by weight of solids at the bottom, and the clear supernatant liquor 12A is trihydrate (having a particle size 50% +200 mesh and 50% −200 mesh) was added gradually with vigorous stirring. The vessel was cooled to maintain the temperature of the reacting mixtures below 110° C. When the reaction was complete, the final clear solution showed a specific gravity of 1.28 g./ml. at 26° C. and gave the analysis of 34.9% F and 17.1% $Al_2O_3$.

SOP was added to 100° F. water in a glass beaker and stirred vigorously to make a solution having a specific gravity of 1.137 g./ml. at 26° C. and having an analysis of 6.82% $Na_2O$, 6.32% $SO_4$, 0.46% F, 0.074% $Al_2O_3$ and 1.19% $CO_2$.

SOP solution at a flow rate of 0.905 gallons/hour was fed through a polyethylene tube to one branch of a polyethylene Y connection. Simultaneously 0.17 gallons/hour of the $HF-Al_2O_3 \cdot 3H_2O$ solution was fed through a polyethylene tube to the other branch of the Y connection. These flow rates were calculated to give stoichiometric proportions of $Na^+$, $Al^{+++}$ and $F^-$ ions at the point of contact in the Y. From the Y, the slurry flowed into a polyethylene vessel 14 cm. inside diameter and about 50 cm. high. The vessel was equipped with an agitator (plastic coated) having 3 blades (4.8 cm. diameter) rotating at 800 r.p.m. The vessel was surrounded by a water bath so as to maintain the temperature inside the reaction vessel at about 130° F. Enough slurry flowed into the vessel to give slurry level of 22 cm. The reaction was allowed to continue for 15 minutes. A settling test on the slurry showed that settling rate was 2.8 ft./hour. A filtration test on the slurry showed that in a 60 seconds cake formation at 20″ Hg vacuum the filtration rate was 183 gallons/hour/sq. ft. of filtering area. The filtrate contained about 6% $H_2SO_4$ by weight with small amounts of dissolved $Na^+$, $F^-$ and $Al^{+++}$ ions.

The slurry was filtered, the filter cake was washed with 180° F. water and the washed cake was dried at 110° C. Analysis of the cake (sodium aluminum fluoride) gave the following calculated composition:

| | Percent by weight |
|---|---|
| $3NaF \cdot AlF_3$ | 59.16 |
| $5NaF \cdot 3AlF_3$ | 38.27 |
| $Na_2SO_4$ | 1.30 |
| $Al_2O_3 \cdot 3H_2O$ | 0.18 |
| Loss on ignition | 1.59 |

Particle size distribution of the product as determined by the Andreasen pipette method gave the following result:

| | Percent |
|---|---|
| +30 microns | 6.5 |
| 30×20 microns | 10.0 |
| 20×10 microns | 11.5 |
| 10×5 microns | 55.0 |
| 5×3 microns | 7.0 |
| −3 microns | 10.0 |

Recoveries of F, Na and Al were above 95% in the sodium aluminum fluoride; and recovery of $SO_4$ was almost 100% in the $H_2SO_4$.

*Example II*

The process was carried out essentially in the same manner as in Example I, except that the SOP solution and $HF-Al_2O_3 \cdot 3H_2O$ solution were mixed at the Y connection at a slower rate. The process data and results are summarized below.

Analysis of $HF-Al_2O_3 \cdot 3H_2O$ solution:
| | |
|---|---|
| Specific gravity at 26° C. | 1.28 |
| F, percent | 35.5 |
| $Al_2O_3$, percent | 15.9 |

Analysis of aqueous SOP solution:
| | |
|---|---|
| Specific gravity at 26° C. | 1.137 |
| $Na_2O$, percent | 6.63 |
| SO, percent | 6.35 |
| F, percent | 0.47 |
| $Al_2O_3$, percent | 0.16 |
| $CO_2$, percent | 1.18 |

Flow rates to Y connection: Gallons/hour
| | |
|---|---|
| SOP solution | 0.314 |
| $HF-Al_2O_3 \cdot 3H_2O$ solution | 0.056 |

Reaction conditions:
| | |
|---|---|
| Reactor vessel I.d. | 5.0 cm. |
| Slurry level | 9.0 cm. |
| Agitator speed | 180 r.p.m. |
| Reaction time | 40 minutes. |
| Settling rate of slurry | 4.5 ft./hr. at 150° F. |
| Filtration rate | 156 gallons/hour/sq. ft. |

Filtrate composition:
| | |
|---|---|
| $H_2SO_4$, percent | 6.09 |
| NaF | 1.02 |
| $Na_2SO_4$ | None |
| $Al_2(SO_4)_3$ | 0.17 |

Calculated product composition: Percent by weight
| | |
|---|---|
| $3NaF \cdot AlF_3$ | 76.16 |
| $5NaF \cdot 3AlF_3$ | 23.58 |
| $Na_2SO_4$ | 0.14 |
| $Al_2O_3 \cdot 3H_2O$ | None |
| LOI | 1.23 |

Particle size distribution: Percent by weight
| | |
|---|---|
| +30 micron | 2.1 |
| 30×20 micron | 9.1 |
| 20×10 micron | 24.9 |
| 10×5 micron | 38.8 |
| 5×3 micron | 6.6 |
| −3 micron | 18.5 |

Recoveries of $Na^+$, $Al^{+++}$ and $F^-$ ions in the sodium aluminum fluoride were above 95%.

This example illustrated that a slower rate of mixing of the two reacting solutions, a higher reaction time and a slower agitation were not detrimental to the process of the invention.

*Example III*

This example is given to illustrate the poor filtrability of the product when the SOP solution was slowly added to the $HF-Al_2O_3 \cdot 3H_2O$ solution.

Fifty-four and one-half grams of 49.33% aqueous HF solution were used to react for 5 minutes with 17.6 g. of alumina trihydrate, the reaction mixture maintained at 100° F. Three hundred thirty-nine grams of SOP solution having an analysis of 6.53% $Na_2O$, 6.36% $SO_4$, 0.47% F. and 0.20% $Al_2O_3$ were added in 25 minutes to the $HF-Al_2O_3 \cdot 3H_2O$ solution. The reaction was allowed to proceed for 10 minutes at a temperature of 140° F. with vigorous agitation.

The reacted slurry gave a settling rate of only 0.53 ft./hr. The filtration rate was extremely slow and there was considerable fine solids in the filtrate.

The sodium aluminum fluoride gave an analysis of 50.54% F. and X-ray analysis showed the presence of $3NaF \cdot AlF_3$ and $5NaF \cdot 3AlF_3$.

*Example IV*

This example illustrates the use of dry solid SOP, the SOP containing a higher percentage of F than the one used in the previous examples. Also, it illustrates that the reaction mixture can be a concentrated slurry.

To carry out the process in concentrated solution, there is first prepared, in a polyethylene vessel, a solution of aluminum fluoride by adding to 48.3 grams of 49.1% HF solution, 18.1 grams of alumina trihydrate during a period of 15 minutes, the materials then being allowed to react for an additional 30 minutes. The reactants are stirred, the solution being cooled to hold the temperature at or below 100° F. There are then added to the reaction mixture 138.8 g. of water. Finally 44.8 g. of SOP analyzing, in grams, Na 16.45, Al 0.17, F 4.6 and $SO_4$ 22.5, are added to the mixture over a 15-minute period. After completion of the addition, the mixture is maintained with stirring for 60 minutes at 100° F. The precipitated cryolite is filtered and washed with 415.4 g. of water at 150°–180° F. and the resultant solid is dried at 110° C. for 16 hours. There are obtained 47.8 g. sodium aluminum fluoride, representing a yield of 95.7% of the theoretical yield of 50 g. The recoveries in the product were 94.5% fluorine and 93.0% sodium. The sodium aluminum fluoride obtained has the following composition:

| | Percent |
|---|---|
| $Na_3AlF_6$ | 90.1 |
| $Na_5Al_3F_{14}$ | 8.0 |
| $Na_2SO_4$ | 1.6 |
| $Al_2O_3 \cdot 3H_2O$ | 2.3 |
| $SiO_2$ | 0.016 |
| Loss on ignition | 0.4 |

The filtrate was a dilute solution of sulfuric acid amounting to 589.3 g. and analyzing, in grams: F, 1.12, Na, 1.31, Al, 0.12, $SO_4$, 22.3, $H_2O$, 564.0.

*Example V*

To carry out the process of the invention in dilute solution, there is first prepared, in a polyethylene vessel, a solution of aluminum fluoride by adding to 48.3 g. of 49.1% HF solution, 18.1 g. of alumina trihydrate during a period of 15 minutes, the materials then being allowed to react during a period of 30 minutes. The reactants are stirred, the solution being cooled to hold the temperature at or below 100° F. There are then added to the reaction mixture 488.8 g. of water, and then 44.8 g. of SOP having the same analysis as in Example IV, over a period of 15 minutes. After completion of the addition, the reaction is maintained with stirring for 60 minutes at 100° F. The precipitated solid is filtered and washed with 417.2 g. of water at 150°–180° F. and the resulting solid is dried at 110° C. for 16 hours. There are obtained 46.7 g. of sodium aluminum fluoride, representing a yield of 93.3% of the theoretical yield of 50 g. The recoveries in the product represented 92.3% of the fluorine and 91.3% of the sodium. The sodium aluminum fluoride obtained has the following composition:

| | Percent |
|---|---|
| $Na_3AlF_6$ | 91.2 |
| $Na_5Al_3F_{14}$ | 7.5 |
| $Na_2SO_4$ | 0.9 |
| $Al_2O_3 \cdot 3H_2O$ | 2.1 |
| $SiO_2$ | 0.009 |
| Loss on ignition | 0.7 |

The filtrate was a dilute solution of sulfuric acid amounting to 921.8 g. and analyzing, in grams: F, 1.65, Na, 1.65, Al, 0.28, $SO_4$, 22.16, $H_2O$, 895.6.

*Example VI*

This example illustrates the use of 35% HF aqueous solution. Seventy-seven and six-tenths grams of 35% aqueous HF solution were used to react for 10 minutes with 17.8 g. of alumina trihydrate, the reaction mixture maintained at 100° F. Forty-nine grams of SOP having an analysis of 45.14% $Na_2O$, 44.53% $SO_4$, 2.74% F, 1.03% $Al_2O_3$, 6.44% $CO_2$ were dissolved in 275.4 g. of water. The SOP solution was added in 7 minutes to the $HF-Al_2O_3 \cdot 3H_2O$ solution and reacted for 15 minutes at 100° F. with agitation. The reacted slurry gave a filtration rate of only about 18 gallons/hour/sq. ft. of filtering area.

The filtrate was about 6% $H_2SO_4$ with minor amounts of $Na^+$, and $F^-$ ions.

The sodium aluminum fluoride analyzed 87.2% $3NaF \cdot AlF_3$, 9.3% $5NaF \cdot 3AlF_3$, 1.1% $Na_2SO_4$, 0.6% $Al_2O_3 \cdot 3H_2O$ and 1.1% LOI. The $F^-$, $Al^{+++}$ and $Na^+$ recoveries were 94, 100 and 93% respectively.

While present preferred embodiments of the invention have been illustrated and described, it will be recognized that the invention may be otherwise variously embodied and practiced within the scope of the following claims.

What is claimed is:

1. Method for the treatment of the salting out product resulting from the evaporation of recycled caustic liquor in the extraction of aluminous ores, said salting out product containing sodium, sulfate and fluorine values, to recover said values in the form of sodium aluminum fluoride and sulfuric acid, which comprises the steps of
   (a) dissolving a member selected from the group consisting of alumina, alumina hydrate, aluminum sulfate, and metallic aluminum in aqueous hydrofluoric acid having a concentration of HF between about 35% and about 50% by weight;
   (b) forming an aqueous solution of said salting out product;
   (c) intimately and rapidly mixing said solutions in such manner that at the point of mixing there are present approximately stoichiometric proportions of sodium, aluminum and fluorine for the formation of said sodium aluminum fluoride;
   (d) maintaining the reaction temperature between about 100° F. and about 150° F. to form a slurry of sodium aluminum fluoride in the solid phase and sulfuric acid in the liquid phase, and
   (e) separating the sodium aluminum fluoride from said slurry.

2. Method for the treatment of the salting out product resulting from the evaporation of recycled caustic liquor in the extraction of aluminous ores, said salting out product containing sodium, sulfate and fluorine values, to recover said values in the form of sodium aluminum fluoride and sulfuric acid, which comprises the steps of
   (a) dissolving alumina hydrate in aqueous hydrofluoric acid having a concentration of HF between about 35% and about 50% by weight;
   (b) forming an aqueous solution of said salting out product;
   (c) intimately and rapidly mixing said solutions in such manner that at the point of mixing there are present approximately stoichiometric proportions of sodium, aluminum and fluorine for the formation of said sodium aluminum fluoride;
   (d) maintaining the reaction temperature between about 100° F. and about 150° F. to form a slurry of sodium aluminum fluoride in the solid phase and sulfuric acid in the liquid phase, and
   (e) separating the sodium aluminum fluoride from said slurry.

3. The method of claim 2, in which the ratio of fluorine to alumina in step (a) is maintained between about 2.0:1 and about 2.2:1.

4. The method of claim 1 in which the concentration of the salting out product solution in step (b) is about 15% by weight.

5. The method of claim 1 in which the proportions in step (c) are selected to yield the sodium aluminum fluoride in the form of cryolite.

6. The method of claim 1 in which step (c) the proportion of fluorine in the reactants is maintained between about 97% and 100% of stoichiometric, and the proportions of sodium and aluminum are maintained between about 100% and about 103% of stoichiometric.

7. The method of claim 1 in which the proportions of the reactants in step (c) are selected so that the sulfuric acid content of the resulting slurry does not exceed about 10% by weight.

8. Method for the treatment of the salting out product resulting from the evaporation of recycled caustic liquor in the extraction of aluminous ores, said salting out product containing sodium, sulfate and fluorine values, to recover said values in the form of sodium aluminum fluoride and sulfuric acid, which comprises the steps of
   (a) dissolving a member selected from the group consisting of alumina, alumina hydrate, aluminum sulfate, and metallic aluminum in aqueous hydrofluoric acid having a concentration of HF between about 35% and about 50% by weight;
   (b) forming an aqueous solution of said salting out product;
   (c) intimately mixing said solutions in such manner that at the point of mixing there are present approximately stoichiometric proportions of sodium, aluminum and fluorine for the formation of said sodium aluminum fluoride;
   (d) maintaining the reaction temperature between about 100° F. and about 150° F. to form a slurry of sodium aluminum fluoride in the solid phase and sulfuric acid in the liquid phase, and
   (e) separating the sodium aluminum fluoride from said slurry by filtration, and washing and drying the sodium aluminum fluoride.

9. Method for the treatment of the salting out product resulting from the evaporation of recycled caustic liquor in the extraction of aluminous ores, said salting out product containing sodium, sulfate and fluorine values, to recover said values in the form of sodium aluminum fluoride and sulfuric acid, which comprises the steps of (a) dissolving a member selected from the group consisting of alumina, alumina hydrate, aluminum sulfate, and metallic aluminum in aqueous hydrofluoric acid having a concentration of HF between about 35% and about 50% by weight;

(b) forming an aqueous solution of said salting out product;

(c) intimately and rapidly mixing said solutions in such a manner that at the point of mixing there are present approximately stoichiometric proportions of sodium, aluminum and fluorine for the formation of said sodium aluminum fluoride;

(d) maintaining the reaction temperature between about 100° F. and about 150° F. to form a slurry of sodium aluminum fluoride in the solid phase and sulfuric acid in the liquid phase, and (e) separating the solid sodium aluminum fluoride from said slurry by settling, removing the supernatant liquor, filtering the sodium aluminum fluoride, and combining the filtrate with the supernatant liquor.

References Cited by the Examiner

UNITED STATES PATENTS

| 1,850,017 | 3/32 | Lehrecke | 23—88 |
| 1,898,506 | 2/33 | Specketer et al. | 23—88 |
| 1,937,956 | 12/33 | Henninger | 23—88 |
| 2,925,325 | 2/60 | Kamlet | 23—88 |
| 2,996,355 | 8/61 | Kamlet | 23—88 |

OTHER REFERENCES

Mellor: Comprehensive Treatise on Inorganic & Theoretical Chemistry, vol. 5, pg. 210 (1924). Longmans, Green & Co., N.Y.

MAURICE A. BRINDISI, *Primary Examiner.*

GEORGE D. MITCHELL, *Examiner.*